(12) United States Patent
Rush, Jr. et al.

(10) Patent No.: US 6,994,819 B2
(45) Date of Patent: Feb. 7, 2006

(54) METHOD TO LOCALLY REROUND PLASTIC PIPE

(75) Inventors: William F. Rush, Jr., Tinley Park, IL (US); Stephen Reyes, Geneva, IL (US); Bruce K. Campbell, Palatine, IL (US)

(73) Assignee: Gas Research Institute, Des Plaines, IL (US)

( * ) Notice: Subject to any disclaimer, the term of this patent is extended or adjusted under 35 U.S.C. 154(b) by 114 days.

(21) Appl. No.: 10/675,344

(22) Filed: Sep. 30, 2003

(65) Prior Publication Data

US 2004/0061259 A1    Apr. 1, 2004

Related U.S. Application Data

(62) Division of application No. 09/686,021, filed on Oct. 11, 2000, now abandoned.

(51) Int. Cl.
*B29C 67/00* (2006.01)
(52) U.S. Cl. .................................................. 264/320
(58) Field of Classification Search ............... 264/319, 264/320, 323
See application file for complete search history.

(56) References Cited

U.S. PATENT DOCUMENTS

| 4,583,390 A | * | 4/1986 | Behrens ........................ 72/416 |
| 4,943,221 A |   | 7/1990 | Friesen ......................... 425/73 |
| 5,499,521 A |   | 3/1996 | Luikart et al. ................ 72/157 |
| 5,676,009 A |   | 10/1997 | Bright et al. ................. 72/161 |
| 6,419,424 B1 | * | 7/2002 | Null et al. .................. 405/174 |

FOREIGN PATENT DOCUMENTS

GB    2017253 A   * 10/1979

* cited by examiner

*Primary Examiner*—Edmund H. Lee
(74) *Attorney, Agent, or Firm*—Mark E. Fejer

(57) ABSTRACT

An apparatus for rerounding plastic pipe includes a housing having a pipe passage extending therethrough. The housing has a moveable outer frame top positionable between an open position and a closed position to enclose a pipe to be rerounded. A pair of opposing jaws are positioned within the housing and on opposite sides of the pipe passage and have a generally symmetrical configuration with respect to one another. A drive mechanism is connected with respect to at least one of the jaws for compressing the jaws with respect to each other resulting in compression of the pipe to be rerounded.

5 Claims, 1 Drawing Sheet

METHOD TO LOCALLY REROUND PLASTIC PIPE

CROSS-REFERENCE TO RELATED APPLICATION

This application is a divisional application of U.S. patent application Ser. No 09/686,021, filed on 11 Oct. 2000, now abandoned.

BACKGROUND OF THE INVENTION

1. Field of the Invention

This invention relates to a pipe rerounding apparatus having a pair of opposing jaws for compressing pipe that is outside of ovality specifications.

2. Description of Prior Art

There are two primary methods that are widely used to correct the ovality of round plastic pipe: (1) rolling rerounding wheels; and (2) hydraulic or mechanical 3-point bending tools. Neither of these inventions is directed specifically to rerounding small sections of pipe. The former is designed for long sections of pipe (typically hundreds of feet) and the latter deals primarily with the curvature at the end of a coil of pipe, rather than with the oval cross-section.

Rolling rerounding wheels, such as the commercially available LINE TAMER™ supplied by MacElroy, Inc. or the PE Pipe Rerounder supplied by PLCS Inc., are designed to reround pipe sections typically hundreds of feet long as the pipe is pulled through a set of vertical, contoured rollers. The MacElroy, Inc. device is mounted on a separate trailer that is towed behind a coiled pipe dispensing trailer, costs approximately US$15,000, and weighs over 1,000 pounds. The PLCS device is mounted on the back of a coiled pipe trailer, costs approximately US$8,000, and weighs over 100 pounds. Both of these devices consist of a pair of tapered rollers that are slightly hour-glass shaped and compress the pipe perpendicular to its long axis. However, the rollers contact the pipe at only a single point. To effect a rerounding of a significant length of pipe, the pipe is pulled through the roller wheels. This pulling requires several hundred to over 1,000 pounds of force, making it impossible to reround pipe manually. These tools cannot be used once the pipe has been placed in a trench because both devices require the pipe be pulled through the rollers, usually as it is dispensed from a coiled pipe dispensing trailer.

A second technique for dealing with coiled pipe locally is a 3 point bending tool. One commercially available example of such a tool is marketed as the CROCOPLAST™. This device bends the pipe at 3 points along the longitudinal axis, the intent being to remove the curvature from the end of the pipe. This tool is not designed to reround the pipe's oval cross-section and it does not effect such a rerounding.

SUMMARY OF THE INVENTION

It is one object of this invention to provide a pipe rerounding apparatus that is portable and adaptable to existing equipment.

It is another object of this invention to provide a pipe rerounding apparatus that compresses pipe for a fixed period of time until the pipe is within ovality specifications.

It is still another object of this invention to provide a pipe rerounding apparatus that includes opposing jaws that quickly and consistently return out-of-specification pipe to within ovality specifications.

It is another object of this invention to provide a pipe rerounding apparatus that may be positioned and used along any portion of a pipeline.

It is yet another object of this invention to provide a pipe rerounding apparatus that includes a drive mechanism for exerting proper compression on an out-of-specification pipe.

When large diameter coiled polyethylene (LDCPE) plastic pipe is coiled at the time of manufacture, it typically is distorted from a round cross-section into an oval. If this ovality exceeds 5%, codes prohibit installation of fittings to the pipe wall until the pipe has been rerounded. The invention described here can be used in small spaces, such as the inside of a trench, to quickly reround a section of the pipe to the required 5% ovality or less.

According to one preferred embodiment of this invention, an oval pipe is compressed in a direction perpendicular to the direction of the long axis of the oval, held in a compressed state for a period of time and released from the compressed state. Because plastic is a viscoelastic material, the degree of compression and the time that the pipe must be held on the compressed state depends upon the ovality of the original pipe and on the temperature of the plastic. In practice, the ovality of the pipe must be over-corrected in that a pipe with its largest dimension oriented, for instance horizontally, must be compressed in a horizontal direction until the pipe is round and then further compressed to have its long axis become the vertical direction. This typically requires over correction to an ovality of greater than 5%. When the pipe is released, it will typically have been so distorted in one direction that it will be more than 5% oval. The pipe will then begin to relax, returning toward its original ovality state. The more the pipe is compressed and the longer it is held in the compressed state, the larger its ovality will be on release and the longer it will take for the pipe to relax from its highly over-corrected oval state to the requisite 5% ovality.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
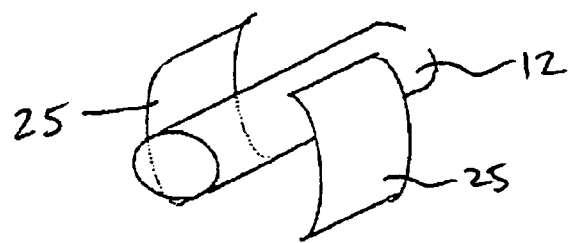
FIG. 1 is a diagrammatic perspective view of a pipe and jaws according to one preferred embodiment of this invention.
Figure 2A:
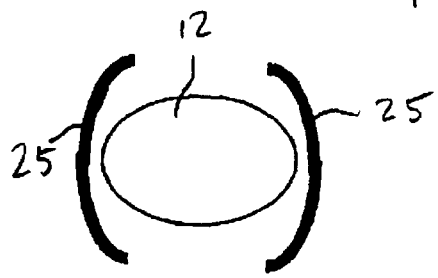
FIG. 2A is a diagrammatic front view of a pipe and jaws in an uncompressed state.
Figure 2B:
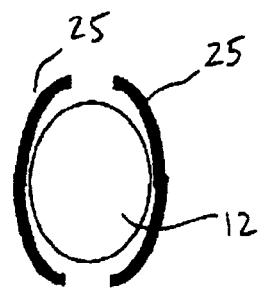
FIG. 2B is a diagrammatic front view of a pipe and jaws in a compressed state.
Figure 3:
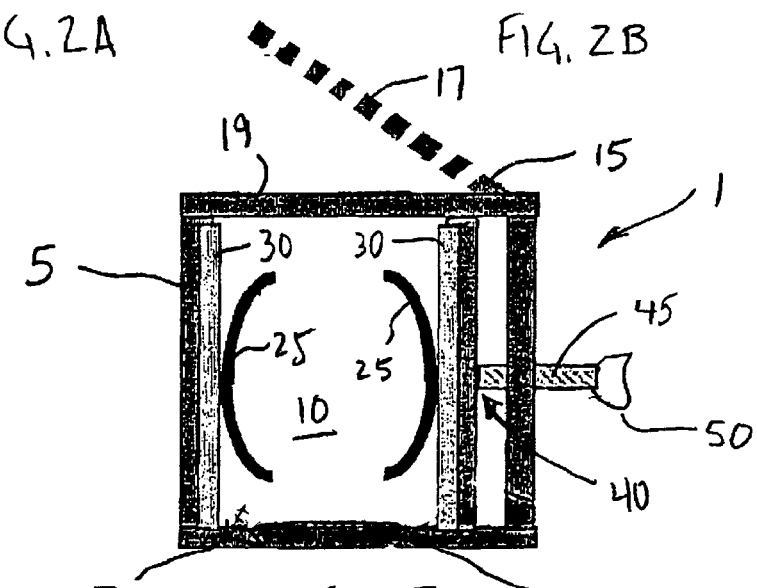
FIG. 3 is a diagrammatic front view of the apparatus according to one preferred embodiment of this invention.

The method and apparatus according to one preferred embodiment of this invention is illustrated in the FIGS. 1–3. Prior to compression, pipe 12, such as PE pipe, is oval with a long axis in a horizontal direction. In an uncompressed state, jaws 25 of rerounding apparatus 1 are not in contact with the pipe in FIG. 2A. FIG. 2B shows pipe 12 in a compressed state as discussed in more detail below. In operation, jaws 25 are moved together and sequentially contact an outer wall of pipe 12, reduce the ovality of pipe 12 to completely round, and then further compress pipe 12 until it becomes oval with the long axis now in a vertical direction. If pipe 12 were to be released immediately at this point, pipe 12 would typically quickly return to its original horizontal ovality. Because plastic is viscoelastic, on release, pipe 12 will always show some tendency to return to its original shape.

The parameters that a pipe installation crew and/or operator can control during field operations are the degree to which pipe 12 is compressed and how long it is held in compression. The parameters that are preferably controlled are the ovality of pipe 12 when it is released and the pipe's ovality as a function of time after release. In order to minimize the labor costs of rerounding, it is desirable to compress pipe 12 for as short a time as possible, to have pipe 12 be within 5% ovality the moment it is released, and have pipe 12 remain within 5% ovality forever after release. This is desirable at all temperatures at which crews would work and for any ovality which would be encountered in the field. If one chooses the parameters of compression fraction and time pipe 12 is held in compression arbitrarily, either the required over-correction is so large that pipe 12 cannot be used immediately after it is rerounded or else the compression may be so slight that pipe 12 returns to its out-of-specification oval condition. The specific parameters according to a preferred embodiment of this invention, and as further discussed below, will result in a rerounding such that the crew can begin installation without delay and pipe 12 will remain within ovality specifications for at least one month.

The parameters of the compression should be chosen to minimize the time the pipe installation crew must wait before starting installation and must also be chosen so that the ovality remains less than 5% along any axis for as long as possible.

As shown in FIG. 3, the apparatus for rerounding pipe 12 includes housing 5. Housing 5, which may be a frame shared from an existing pipe squeeze-off tool as discussed in more detail below, is preferably a rigid steel framework having pipe passage 10 extending between each extremity 7 of housing 5.

Rerounding apparatus 1 may further include moveable frame top 15 positioned with respect to housing 5. Moveable frame top 15 is preferably positionable in an open position 17 and a closed position 19. According to one preferred embodiment of this invention, moveable frame top 15 comprises a hinged door permitting housing 5 to be positioned around pipe 12. Moveable frame top 15 may alternatively comprise a sliding door or any other embodiment that permits access to an interior of housing 5, specifically to pipe passage 10.

A pair of jaws 25 are preferably positioned within housing 5 and on opposite sides of pipe passage 10. Jaws 25 preferably have a symmetrical configuration with respect to one another.

According to one preferred embodiment of this invention, two sections of a rigid material, preferably steel, are formed into opposing jaws 25. Jaws 25 preferably include a radius of curvature 25%–100% larger than the radius of curvature of pipe 12 to be rerounded. Jaws 25 are typically between approximately 8 and 24 inches long but should be at least 4 inches longer than the section of pipe to be locally rerounded. Jaws 25 are preferably of sufficiently small arcs so that it is possible to compress pipe 12 to 70% of its original diameter without contact between opposing edges of opposing jaws 25 and/or between edges of jaws 25 and compressed portion of pipe 12.

Jaws 25 preferably curve inwardly with respect to one another, preferably in a generally smooth, concave manner. Alternatively, jaws 25 may include a number of angled, flat surfaces that form a generally inward-facing contact surface.

According to a preferred method of operation, jaws 25 are compressed toward one another with pipe 12 to be corrected placed between them. Preferably, jaws 12 do not make contact with each other or with the compressed ends of pipe 12 when pipe 12 is compressed to approximately 70% of its nominal diameter.

Rerounding apparatus 1 may further include gauge 22 positioned on housing 5 to determine relative measurements of pipe 12. Gauge 22 may be used to measure a distance of a diameter of pipe 12, a major/minor axis before compression, a minor/major axis after compression and/or any other distance measurements relevant to the rerounding calculations.

Drive mechanism 40 is preferably connected with respect to at least one jaw 25. Drive mechanism 40 preferably includes drive screw 45 or other device known to those having ordinary skill in the art for compressing the jaws 25 with respect to each other.

Drive mechanism 40 for compressing jaws 25 together may alternatively comprise a hydraulic, pneumatic, electric motor or power drill or any other suitable mechanism for applying force to jaws 25. Drive mechanism 40 may further include fitting 50 connected with respect to drive screw 45 which is adaptable to connection with a motor (not shown). According to a preferred embodiment of this invention, the configuration of jaws 25 and drive mechanism 40 eliminate the need for hundreds to thousands of pounds of force to move rollers along pipe 12, such as required in prior art rerounding tools.

As discussed above, jaws 25 and drive mechanism 40 may be mounted in a suitable housing 5, which may be slid over an end of pipe 12. Housing 5 may alternatively be a frame with a closing member that can be opened to permit housing 5 to be closed around pipe 12 without sliding over an end of pipe 12. Housing 5 should be resistant to loads that the compression of pipe 12 places on the drive mechanism 40. Housing 5 can be solid if only ends of pipe 12 are to be rerounded. Housing 5 is preferably openable if rerounding apparatus 1 is to be used on sections of pipe 12 for which it is not practical to slip housing 5 around the end of pipe 12.

In practice, jaws 25 may be mounted inside of a plastic pipe squeeze-off tool frequently found on job sites where plastic pipe is being installed. The squeeze-off tool is essentially a frame as shown in FIG. 3.

Figure 4:
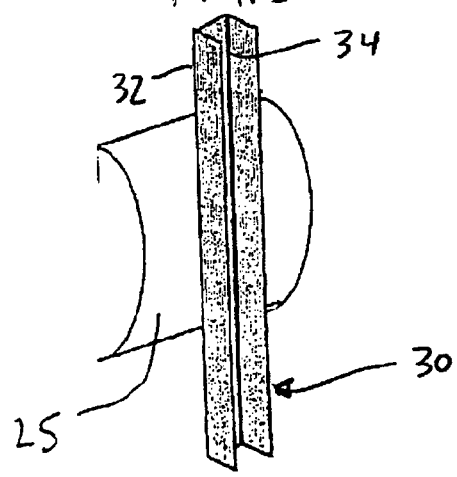
FIG. 4 is a perspective view of a support bar and jaw according to one preferred embodiment of this invention.

As shown in FIGS. 3 and 4, an important practical aspect of the invention is too retrofit or incorporate the device into an existing, standard squeeze-off tool. A squeeze-off tool is typically used to crimp a pipe and thus cut-off flow of the fluid or gas within the pipe. The squeeze-off tool often includes a framework into which rerounding apparatus 1 can be incorporated. To facilitate incorporating rerounding apparatus 1 with respect to the squeeze-off machine, each jaw 25 should preferably be rigidly attached to support bar 30. Support bars 34 are preferably just wide enough to slide over the rigid bars of housing 5, i.e., the sides of the squeeze-off tool. Jaws 25 are preferably positioned on closed, flat side 32 of support bar 30 and opposite from U-shaped channel 34 in support bar 30. A purpose of support bars 30 is to hold jaws 25 in the approximate center of support bars 30 and thus pipe passage 10 while rerounding apparatus 1 is assembled around pipe 12. Without support bars 30, jaws 25 are difficult to hold in place during assembly, since gravity pulls them to the bottom of housing 5.

Alternatively, jaws 25 may be mounted inside drive members of a coiled pipe rerounding machine familiar to those having ordinary skill in the art.

Therefore a field operator of the apparatus according to one preferred embodiment of this invention would first identify pipe 12 that required rerounding. The operator would open frame top 15 in housing 5 and position pipe 12 within pipe passage 10 in housing 5. Housing 5 would be closed around pipe 12, preferably with pipe 12 in a centered position with housing 5. The operator would next compress the pair of jaws 25 positioned on opposite sides of pipe passage 10 around pipe 12 up to approximately 70% of an original diameter of pipe 12, without contact between jaws 25. The operator then leaves pipe 12 in a compressed state within jaws 25 for a predetermined amount of time whereupon jaws 25 are released and newly rerounded pipe 12 is removed from housing 5.

EXPERIMENTAL DATA

According to one embodiment this invention for rerounding a 4 inch diameter medium density polyethylene (MDPE) pipe, jaws were constructed from 12 inch long sections of 8 inch diameter steel pipe. The pipe was cut to a length of 12 inches by sawing it perpendicularly to the longitudinal axis of the pipe. The resulting 12 inch section was then cut into four pieces by cutting it parallel to the axis of the pipe to form the jaws similar to those shown in FIG. 1. The cuts were made such that when the jaw is laid on a flat surface, the distance between the flat surface and the top of the arc section of the jaw is approximately 1.5 inches. Such a measurement correspondence to an arc of the pipe of about 7 inches. This distance permits the pipe to be compressed enough to reround the pipe but prevents the jaws from contacting each other when rerounding the pipes. The edges of the jaws were then ground to give them a slight taper to prevent a sharp edge from marring the surface of the pipe after release.

For the experimental apparatus, the jaws were screw driven. The housing which drives the jaws is a commercially available plastic pipe squeeze-off tool which includes a frame that can be operated to slip around a very long pipe or a pipe which has both of its end buried. As a specific example, for MDPE of 4 inch nominal diameter, efficient operation may be achieved at room temperature by compressing the pipe to 80% of its nominal diameter and releasing it after 2 minutes. The pipe is within specification on release and will remain within specification (2.3% ovality) for at least one month. This device will effectively reround approximately 8 inches of pipe. Even compression by the curved plates will exert a force on the sections that were compressed, tending to return the pipe to its original oval configuration. There was a 2 inch transition region on each end of the rerounded section. Over the length of this transition region, the pipe changes configuration between its original oval cross-section and pipe that is within specification. This device can be constructed fairly inexpensively and no part that must be handled should weigh more than 75 pounds. The device can be used in connection with a frame that is a tool that would already be in the tool collection of field crews working with plastic pipe.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. In an apparatus comprising a housing having a pipe passage extending between each extremity of said housing, a pair of jaws having a generally symmetrical configuration with respect to each other disposed within said housing on opposite sides of said pipe passage, and a drive mechanism connected with respect to at least one of said jaws suitable for changing a distance between said jaws, a method for re-rounding flexible plastic pipe comprising the steps of:

positioning said housing around an out-of-round flexible plastic pipe whereby said flexible pipe is disposed within said pipe passage and a major axis of said out-of-round flexible plastic pipe is substantially perpendicular to said jaws;

compressing said out-of-round flexible plastic pipe by reducing said distance between said jaws until said major axis becomes a minor axis, forming a compressed flexible plastic pipe; and decompressing said compressed flexible plastic pipe by increasing said distance between said jaws, thereby allowing the compressed flexible plastic pipe to relax into a substantially round flexible plastic pipe.

2. A method in accordance with claim 1, wherein said minor axis has a length in a range of about 70% to about 95% of a diameter of said flexible plastic pipe.

3. A method in accordance with claim 1, wherein said compressed flexible plastic pipe is maintained in a compressed state for a predetermined period of time.

4. A method in accordance with claim 1, wherein said flexible plastic pipe is compressed without contact between said jaws.

5. A method in accordance with claim 1, wherein said housing comprises a moveable top positionable between an open position and a closed position, thereby enabling said housing to be positioned around said flexible plastic pipe.

\* \* \* \* \*